United States Patent
Matsumoto et al.

(10) Patent No.: US 9,299,986 B2
(45) Date of Patent: Mar. 29, 2016

(54) METHOD FOR MANUFACTURING METAL-MADE THREE-DIMENSIONAL SUBSTRATE FOR ELECTRODES, METAL-MADE THREE-DIMENSIONAL SUBSTRATE FOR ELECTRODES AND ELECTROCHEMICAL APPLIED PRODUCTS USING THE SAME

(75) Inventors: Isao Matsumoto, Osaka (JP); Hua Zhou, Osaka (JP); Koji Kuwana, Osaka (JP)

(73) Assignees: M&G ECO-BATTERY CO., LTD., Osaka (JP); JAPAN CAPACITOR INDUSTRIAL CO., LTD., Tokyo (JP)

( * ) Notice: Subject to any disclaimer, the term of this patent is extended or adjusted under 35 U.S.C. 154(b) by 521 days.

(21) Appl. No.: 13/106,057

(22) Filed: May 12, 2011

(65) Prior Publication Data

US 2012/0100432 A1 Apr. 26, 2012

(30) Foreign Application Priority Data

Oct. 20, 2010 (CN) .......................... 2010 1 0582391

(51) Int. Cl.
*H01M 4/66* (2006.01)
*H01M 4/78* (2006.01)
*H01M 4/74* (2006.01)

(52) U.S. Cl.
CPC .............. *H01M 4/661* (2013.01); *H01M 4/662* (2013.01); *H01M 4/742* (2013.01); *H01M 4/78* (2013.01); *Y02E 60/122* (2013.01); *Y02E 60/124* (2013.01); *Y02P 70/54* (2015.11); *Y10T 29/301* (2015.01)

(58) Field of Classification Search
CPC ............ B21B 27/02; B21B 1/40; B21B 1/16; B21B 21/00; B21B 1/227; B21B 27/005; B21D 31/00; B21D 13/04; B21D 5/16; A01B 29/00; B44B 5/00
USPC ....................... 429/245, 233; 72/379.2, 252.5, 72/195–198, 180, 379.6, 185, 186; 29/2, 29/17.2, 623.1–623.5; 492/1, 28, 30, 32, 492/33, 34, 35, 36, 37; 83/663; 264/3.2, 264/46.3, 172.19, 173.1
See application file for complete search history.

(56) References Cited

U.S. PATENT DOCUMENTS

| | | | | |
|---|---|---|---|---|
| 6,176,819 | B1 * | 1/2001 | Boegli | B31F 1/07 493/194 |
| 6,605,388 | B1 * | 8/2003 | Goda | H01M 4/70 29/2 |
| 2003/0180621 | A1 * | 9/2003 | Matsumoto | H01M 4/0404 429/233 |
| 2008/0113128 | A1 * | 5/2008 | Nakajima | B29C 66/73921 428/34.1 |
| 2010/0251864 | A1 * | 10/2010 | Rose | A47C 27/144 83/13 |
| 2010/0279158 | A1 * | 11/2010 | Kumakari | H01M 4/13 429/94 |

FOREIGN PATENT DOCUMENTS

JP 2002198055 A 7/2002
JP 2006012801 A 1/2006

* cited by examiner

*Primary Examiner* — Patrick Ryan
*Assistant Examiner* — Kiran Quraishi
(74) *Attorney, Agent, or Firm* — The Webb Law Firm

(57) ABSTRACT

In a method for manufacturing a metal-made three-dimensional substrate, a metal foil is passed between a pair of rollers 21 and 22. Each surface S of a pair of the rollers 21 and 22 is provided with protrusion portions 23 arranged in a grid pattern, and the protrusion portions 23 are arranged so that protrusions 23 of the one roller 22 are oriented toward the center 27 of a virtual quadrangle having four adjacent protrusion portions 23a to 23d of the other roller 21 as the apices.

3 Claims, 7 Drawing Sheets

METHOD FOR MANUFACTURING METAL-MADE THREE-DIMENSIONAL SUBSTRATE FOR ELECTRODES, METAL-MADE THREE-DIMENSIONAL SUBSTRATE FOR ELECTRODES AND ELECTROCHEMICAL APPLIED PRODUCTS USING THE SAME

TECHNICAL FIELD

The present invention relates to a method for manufacturing a metal-made three-dimensional substrate used as electrodes of electrochemical applied products. More specifically, the present invention provides a method for manufacturing a metal-made three-dimensional substrate capable of being manufactured continuously without interruption by cleaning rollers for forming concavities and convexities on a metal foil.

This application claims priority based on Chinese Patent Application No. 201010582391.4 filed on Oct. 20, 2010, the contents of which are incorporated in their entirety by reference herein.

BACKGROUND ART

In recent years, for the purpose of solving global environmental issues and energy issues, introducing hybrid electric vehicles (HEV) and electric vehicles (EV) and expanding the market share thereof has been drawing attention as effective means for saving oil consumption to about a half or less. In particular, HEV having already been put into practical use, presently, with nickel-hydrogen batteries (Ni/MH batteries) having improved power characteristics mounted, is expanding its market rapidly. Further, with a view to mounting to the HEV with expanding market, not only improving the characteristics of Ni/MH batteries but also motivation of developing lithium-ion batteries, improved capacitors and the like are vigorous.

Since this has been used under harsh conditions in which many batteries are connected in series and exposed to broadly ranged temperature, vibration or the like, much more improved reliability than the conventional HEV has been required, and further, at the same time, powering up a power source (improvement in high-rate discharge property) has been also required for the purpose of starting and running HEV and the like.

The present application suggests with a view to improving energy density (small size: Wh/L and light weight: Wh/kg) and reducing the cost of electrochemical applied products represented by secondary batteries such as Ni/MH batteries and lithium-ion batteries and capacitors, and to be specific, it provides a means to achieve a goal by improving electrode substrates of electrodes to be used.

In addition, although the present invention is extremely effective for particularly electrochemical applied products for motive power use such as HEV, it is also applicable to generally used electrochemical applied products.

Hereinafter, detailed explanation will be made with respect to a cylindrical sealed Ni/MH battery, which has already been put into practical use as a power source for HEV. Here, this Ni/MH battery refers to an 1.2 V alkaline secondary battery in which a nickel electrode using nickel oxide powder is used as a positive electrode, a negative electrode using hydrogen absorbing alloy powder is used as a negative electrode, a porous non-woven cloth of synthetic fiber is used as a separator, and alkaline solution comprising potassium hydroxide (KOH) as a major component is used as electrolyte.

In developing the Ni/MH battery developed and put into practical use around 1990s in HEV use required for power characteristics, the battery basically employs the same structure as that of the existing nickel-cadmium batteries (Ni/Cd batteries). In other words, the battery employs the following structure. An electrode group with a positive electrode and a negative electrode spirally-rolled interposing a separator therebetween, which is thinner than generally used batteries, is contained in a bottomed cylindrical can. In the positive electrode, a part of a holder (i.e., an electrode substrate) of active material powder (mainly, nickel hydroxide, $Ni(OH)_2$) is electrically connected to a cover body interposing a metal-made current collecting plate and an electrode lead plate therebetween. In the negative electrode, a nickel-plated punched steel (NPPS) substrate is contacted with a bottom portion of the bottomed cylindrical can or partly welded, thereby being electrically connected to the bottomed cylindrical can.

In the case where the size of the battery becomes larger as in the battery for HEV use, when paste type electrodes having high energy-density and light weight are employed in the cylindrical battery, a possibility of micro short circuit is increased by falling-off of the active material powder from cut edge portions of both the electrodes. For this reason, there has been used a sintered type positive electrode with very little falling-off of the active material powder from the cut edge portions of the electrodes, that is, a battery which inhibits this issue.

However, the cylindrical sealed Ni/MH battery employing the sintered type positive electrode contains a large amount of nickel, its energy density is small, and nitrate is mixed into the battery during the manufacturing process. As a result, the battery gets heavy and large, and it has a self-discharge problem. For this reason, it has been important issue to make full use of the paste type positive electrode in the cylindrical sealed Ni/MH battery.

Therefore, the present inventors solved the problems of micro short circuit by first using a flexible three-dimensional substrate (3DF, 3-dimensional foil) as the substrates of both electrodes (Patent Literature 1), and bending the electrode edge that corresponds to an electrode lead portion together with a separator to form a bag of the separator, and they put the paste type electrodes into practical use (Patent Literature 2). As a result, the cylindrical sealed Ni/MH battery which is made small in size, light in weight and low-cost has been able to be provided. However, there are still some issues in mass manufacturing of the three-dimensional substrate to be used and in rollers to be used for processing of the electrodes.

CITATION LIST

Patent Literature 1

Japanese Patent Application Publication, Tokukai, No. 2002-198055

Patent Literature 2

Japanese Patent Application Publication, Tokukai, No. 2006-12801

SUMMARY OF INVENTION

Technical Problem

As described above, it is important to employ the flexible three-dimensional substrate that is easily bent in order to make full use of the paste type positive electrode with a high energy density in the cylindrical sealed Ni/MH battery. However, there are problems left in the following respects when this electrode substrate is mass-manufactured and used as the electrode substrate.

Problem 1: For applying a surface processing to a metal foil for electrodes, a pair of rollers used in the surface processing of a synthetic resin film or artificial leather is used. The one roller of this pair has a pattern with innumerable fine protrusions (convex portions) and perforated portions (concave portions) on the surface, while the other corresponding roller thereof has a pattern inverting this pattern. In other words, the perforated portions (for example, concave portions of water bottle shape) which receive the protrusions of the one roller are formed on the other roller. Then, this pair of rollers is used to apply a surface processing to make the surface of the metal foil uneven.

However, when this pair of rollers is used for processing of the metal foil having far higher hardness than resins or artificial leather, minute fragments (chips) fallen off from the tip of the convex portions of the processed metal foil are clogged and accumulated in the perforated portions of the rollers one after another, thereby making the subsequent processing difficult.

Problem 2: Since the three-dimensional substrate comprises a small amount of metal, such as about ⅔ of a conventionally-used foamed nickel substrate and the surface area of the substrate is small, the contact area between the substrate and active material is decreased. As a result, the capability of collecting current from the active material powder has been poor. Thus, it may cause deterioration of high-rate discharge property.

Problem 3: As surface processing of the metal foil is continuously operated, the protrusions of the rollers start to be worn away from the tip portion. The degree of wear is different between the respective protrusions, thereby causing a difference in height between the protrusions.

Furthermore, a difference in the degree of wear between the protrusions of each of the pair of rollers is also generated, whereby the protrusions have different heights between the pair of rollers. In this case, the height of the convex shape of the processed three-dimensional substrate becomes different between the front and back sides. In other words, a non-processed portion (a portion having no concavities and convexities) of the three-dimensional substrate is displaced from the center position in the thickness direction to the roller side where the protrusions are largely worn away. As a result, the current collecting performance of the three-dimensional substrate in electrodes may be deteriorated.

With regard to the problem 1, a method of taking off the rollers regularly and removing the minute fragments of the metal foil which were accumulated in the perforated portions can be considered. However, since many minute fragments are overlappingly pressed thereinto, removal of the minute fragments is extremely difficult under present circumstances.

With regard to the problem 2, a method for coating and sintering metal powder can be considered with a view to reducing electric resistance by improving the contact with the active material powder after the three-dimensional processing, but cost reduction, that is a feature of the three-dimensional substrate, can not be expected because the manufacturing process becomes complicated.

With regard to the problem 3, it can be solved by changing a material at the tip portion of the protrusions formed on the roller to a material having wear resistance and then increasing a hardness of the protrusions. However, on the contrary, there remains a problem that the tip portion is easily broken.

Solution to Problem

These problems can be solved by devising the shape of the surface of a pair of the rollers to be used for three-dimensional processing of the metal foil. Hereinafter, with a cylindrical sealed Ni/MH battery taken as an example of the electrochemical applied products, the means for solving the above three problems will be described with an example of the substrate in which a nickel foil that is a metal-made three-dimensional substrate for electrodes is three-dimensionally processed.

The problem 1 was caused because the minute fragments fallen off from the tip of the convex portions of the processed metal foil were accumulated in the perforated portions having a water bottle shape of the other roller, which receive the protrusions formed on the one roller. Therefore, it was found that the problem can be solved by a structure having no perforated portions of water bottle shape. In other words, the surface of the both rollers is processed so as to arrange innumerable protrusion portions in a grid pattern. When the metal foil is three-dimensionally processed, three-dimensional processing is performed by interposing the metal foil so that the protrusion portion of the one roller is settled in a space surrounded by four adjacent protrusion portions of the other roller. Because there are no perforated portions in the rollers, the fallen-off minute fragments are not accumulated between the respective protrusion portions, whereby the problem 1 can be solved.

With regard to the problem 2, attention was focused on providing innumerable wrinkles on the surface of the metal foil during the three-dimensional processing in order to increase the contact area between the electrode substrate and the active material. First, paying attention to a rising angle of the side surface of the protrusion portion formed on the roller surface from the roller surface, it was found that when the rising angle is set in the range of 55 to 75 degrees, innumerable wrinkles can be formed without causing cracks on the surface of the metal foil between the hollow convex portions of the three-dimensional substrate. As a result, the contact area between the three-dimensional substrate and the active material increases, thereby allowing to enhance the current collecting capability of electrodes and to improve the high-rate discharge performance of the electrodes.

With regard to the problem 3, instead of the shape in which fine protrusion portions formed on the surface of the rollers are continuously tapered, the shape in which protrusion portions are discontinuously tapered with at least one flat portion between a bottom portion and the tip of the protrusion portions has been employed. Attention has been focused on a method for allowing the protrusion portions of the both rollers to ensure a processed height of the distance from the tip to the position of the flat portion. It has been found that due to the employment of the protrusion portions having such a shape, the height of the convex portion to be formed can be made constant by the flat portion when three-dimensionally processing the metal foil. Therefore, even if wear occurs to the tip of the protrusion portions, the non-processed portion of the three-dimensional substrate can be prevented from displacing from the center position in the thickness direction.

DETAILED DESCRIPTION OF THE INVENTION

Hereinafter, embodiments of the present invention will be explained with reference to the drawings.

Figure 1:
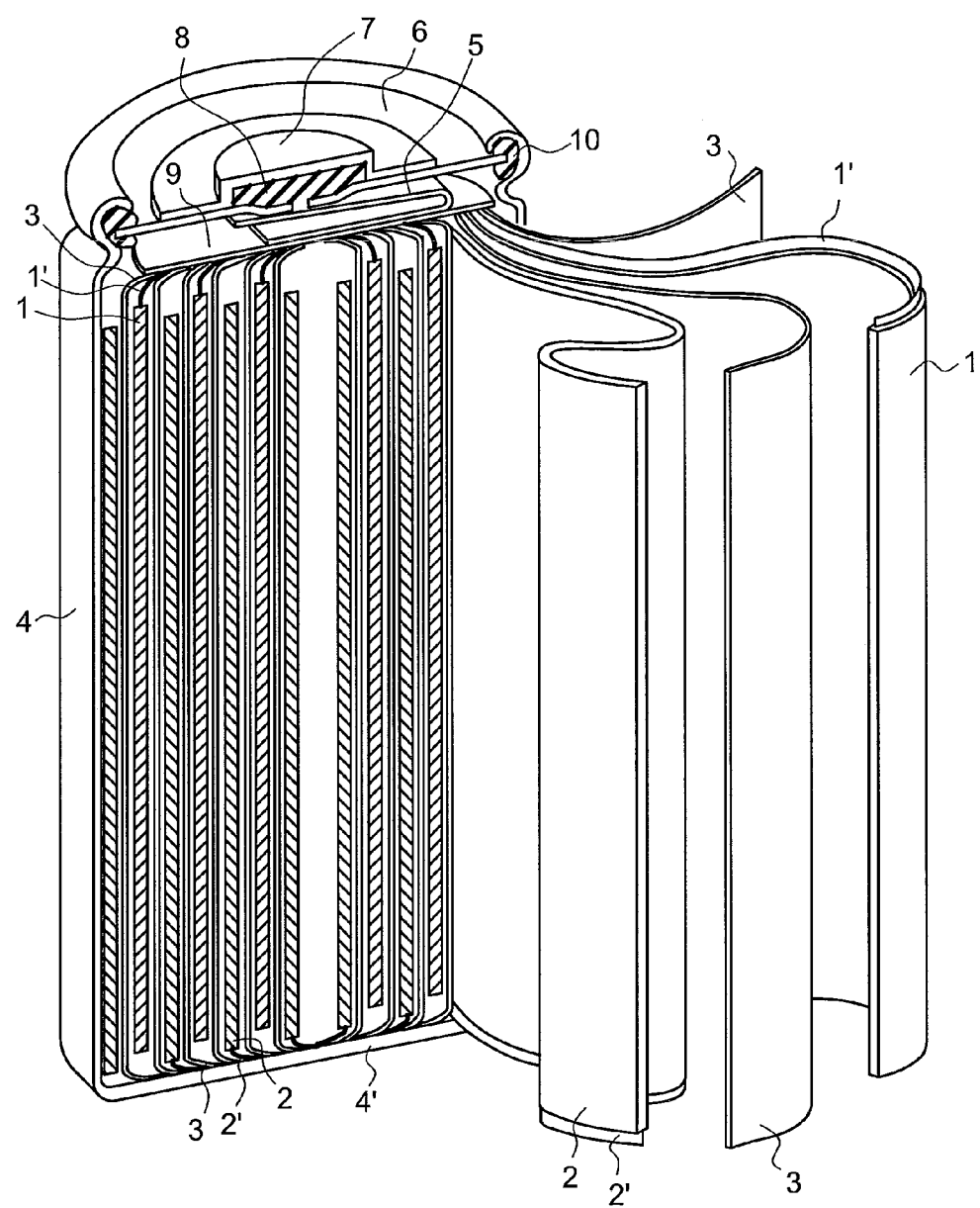
FIG. 1 is a schematic cross-sectional view of the Ni/MH battery according to the present invention.

As an example of the embodiments of the present invention, a cross-sectional view of a cylindrical Ni/MH battery having a spirally-rolled electrode group is shown in FIG. 1. The electrode group in which a positive electrode 1 employing nickel-made three-dimensional substrate as the electrode substrate and a negative electrode 2 are spirally rolled with a separator 3 interposed therebetween is contained in a bottomed cylindrical can 4. A metal exposure portion 1' of the positive electrode 1, which is bent in the center direction of a spiral together with the separator 3, is connected to a cover body 6 interposing a metal lead plate 5 that is electrically connected to a metal-made current collecting plate 9 therebetween. It is noted that a cap 7 embedding a rubber valve body 8 is mounted on the cover body 6.

A metal exposure portion 2' of the negative electrode 2, which is bent in the center direction of the spiral together with the separator 3, is electrically connected to a bottom portion 4' of the bottomed cylindrical can 4. Here, in order to prevent short circuit of the positive electrode 1 and the negative electrode 2, the battery employs the structure that one end of the respective electrodes is shifted by 1 to 2 mm from the bent portion of the metal exposure portion of the opposite electrode. The above structure of the positive and negative electrodes 1 and 2 is the structure disclosed by Patent Literature 2.

It is noted that the battery may employ the existing structure in which the metal exposure portions 1' and 2' functioning as electrode leads of the positive electrode 1 and the negative electrode 2 are spot-welded in contact perpendicularly with the bottomed cylindrical can 4 and the metal-made current collecting plate 9.

Figure 3A:
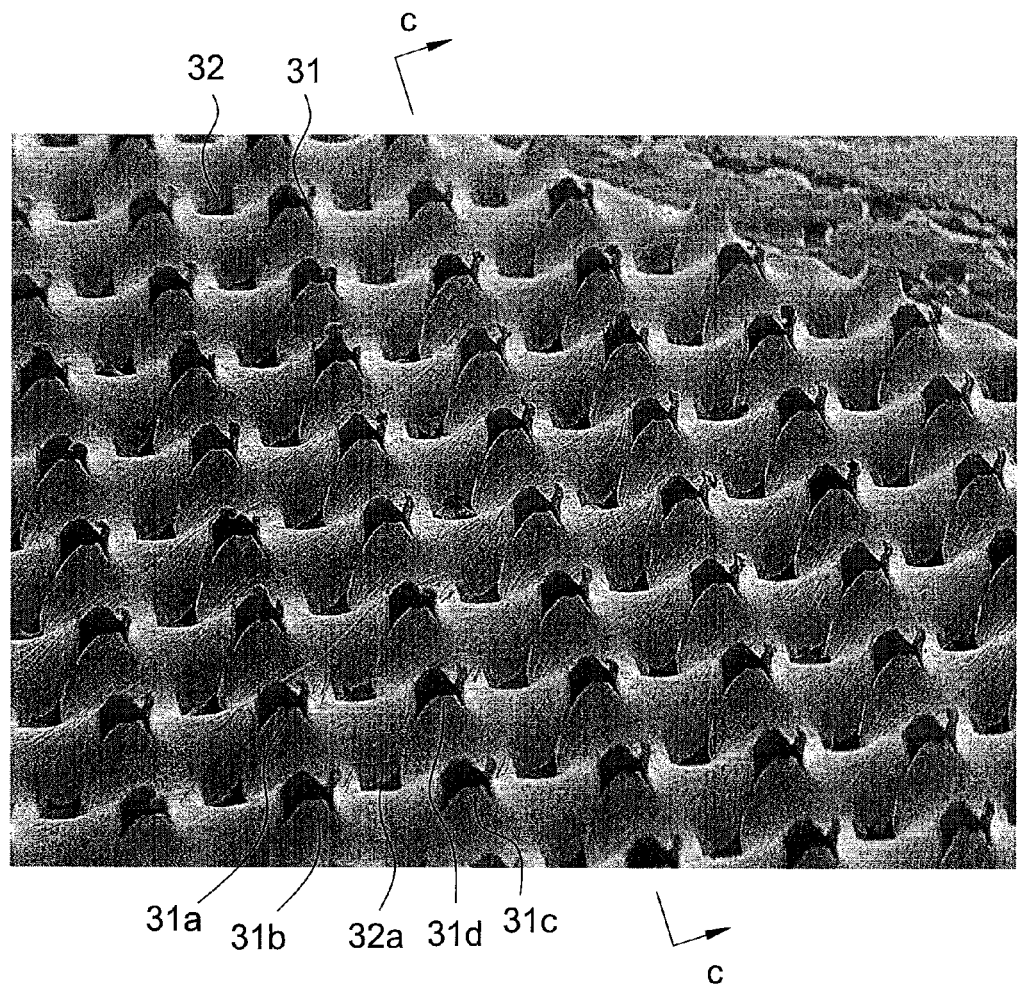
FIG. 3a is a view showing one example of the three-dimensional substrate according to the present invention.
Figure 3B:
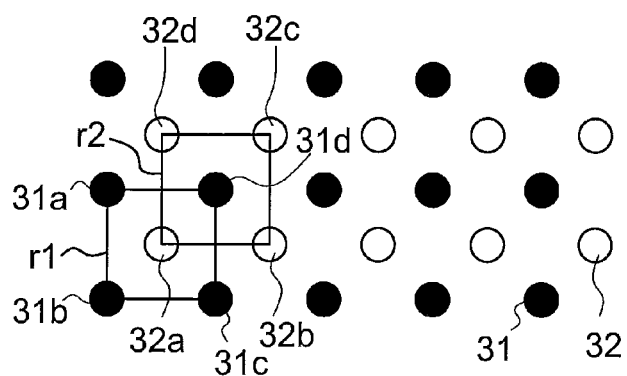
FIG. 3b is a view showing location of the hollow convex portions and the hollow concave portions of the electrode substrate.

Taking the positive electrode 1 as an example, a photograph of the nickel-made three-dimensional substrate is shown in FIG. 3a. In a substrate 20, hollow convex portions 31 are arranged in a grid pattern and hollow concave portions 32 are also arranged in a grid pattern. FIG. 3b is a schematic view showing the location of the hollow convex portions 31 and the hollow concave portions 32, where the convex portions 31 are represented by black circles and the concave portions 32 are represented by white circles. Four adjacent convex portions 31a, 31b, 31c and 31d are located at the apices of a virtual quadrangle r1 and a concave portion 32a is located at the center of the quadrangle r1. Likewise, four adjacent concave portions 32a, 32b, 32c and 32d are located at the apices of a virtual quadrangle r2 and the convex portion 31d is located at the center of the quadrangle r2.

Figure 3C:
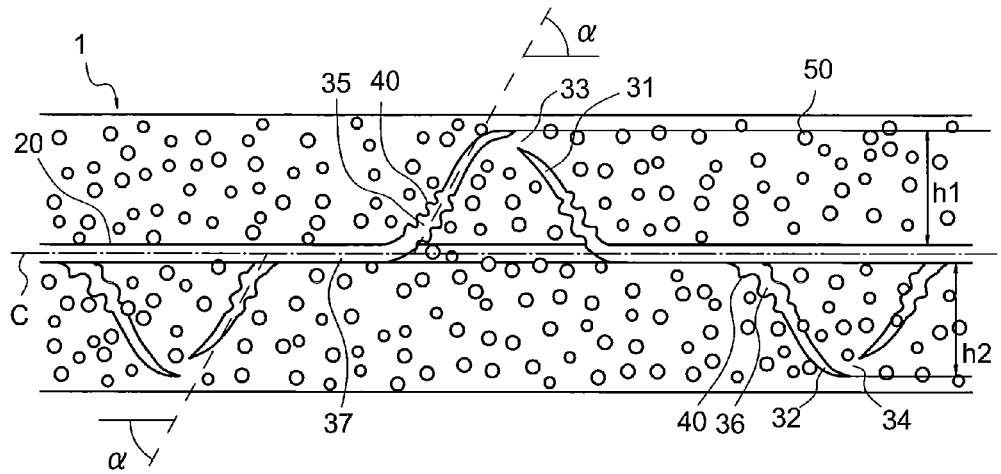
FIG. 3c is a schematic cross-sectional view of the nickel positive electrode of the Ni/MH battery according to the present invention.

Furthermore, a schematic cross-sectional view of a c-c line of FIG. 3a is shown in FIG. 3c. There is shown in FIG. 3c the nickel positive electrode 1 that is dried and pressed after paste of active material powder 50 mainly comprising nickel hydroxide (Ni(OH)$_2$) is filled into and/or coated onto the substrate 20. Arising angle α of a side surface 35 of the hollow convex portion 31 and a side surface 36 of the hollow concave portion 32 (an angle made by a non-processed portion 37 of the substrate 20 and the side surface 35 or 36 of the substrate 20) is preferably 55 to 75 degrees, more preferably 55 to 65 degrees. When the side surfaces 35 and 36 are processed with the preferable rising angle α, innumerable wrinkles 40 are formed on the side surfaces 35 and 36. The wrinkles 40 allow the contact area between the substrate 20 and the active material powder 50 to be increased (contact resistance to be decreased) and the current collecting capability of the electrode 1 to be enhanced, and as a result, the high-rate discharge performance of the electrode 1 is achieved. When the rising angle α is less than 55 degrees, the number of the wrinkles becomes small, thereby not increasing the contact area with the active material powder 50. Additionally, when the rising angle α exceeds 75 degrees, the hollow convex portion 31 and the hollow concave portion 32 are easily broken.

Heights h1 and h2 of the hollow convex portion 31 and the hollow concave portion 32 from the non-processed portion 37 are substantially equal to each other. As a result, deterioration in current collecting performance of the three-dimensional substrate 20 can be prevented without displacing the non-processed portion 37 of the three-dimensional substrate 20 from the center position C in the thickness direction. Opening portions 33 and 34 are also provided at the tips (or side surfaces) of the hollow convex portion 31 and the hollow concave portion 32.

Figure 4A:
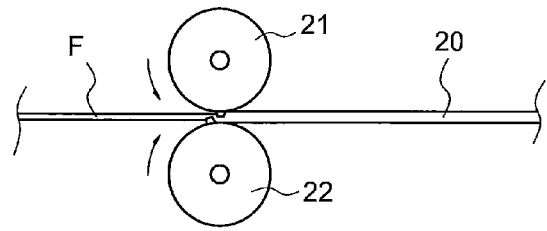
FIG. 4a is a schematic view showing rollers used for manufacturing the three-dimensional substrate according to the present invention.
Figure 4B:
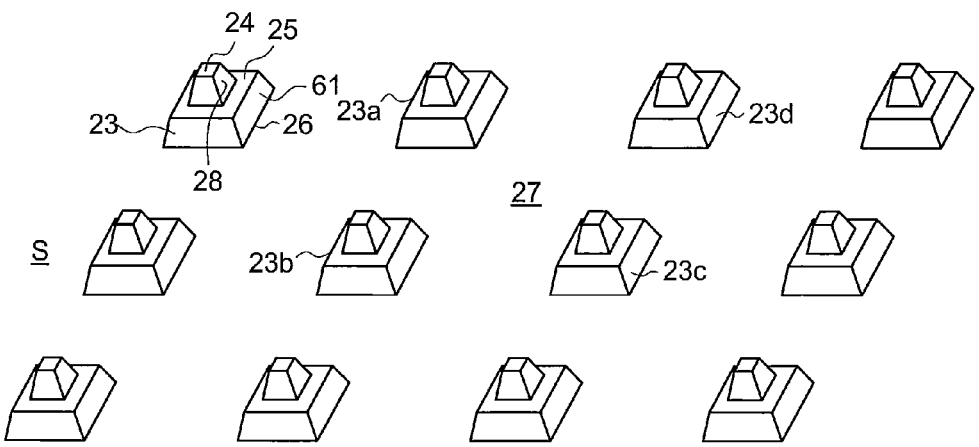
FIG. 4b is a schematic view showing protrusions on the roller surface.

Next, a method for manufacturing the substrate 20 will be explained. FIG. 4a shows a pair of rollers for preparing the three-dimensional substrate 20. Three-dimensional processing is performed by interposing a metal foil F between a pair of rollers 21 and 22 having protrusions, thereby forming into the three-dimensional substrate (3DF) 20. FIG. 4b is a view showing a surface of the roller 21. The rollers 21 and 22 are made by cutting an iron-made (steel stock: NAK 55) roller to a surface S so as to leave protrusion portions 23. It is noted that the vicinity of the tip portion 24 of the protrusion 23, which is easily worn, is increased in hardness, for example, by hardening.

The protrusion portions 23 are provided in a grid pattern on the surface S. The protrusion portion 23 comprises a base bottom portion 61 having a truncated pyramidal shape in which a bottom surface 26 is of a square shape and the tip portion 24 having a pyramidal shape. In order to ensure the strength of the protrusion portion 23, the tip portion 24 is formed into, for example, a square shape with each side of about 10 μm. A flat portion 25 (that is the top face of the base bottom portion 61) is also provided substantially in the center in the height direction of the protrusion portion 23. By the flat portion 25, the height h1 of the hollow convex portion 31 and the height h2 of the hollow concave portion 32 are adjusted so as to be substantially equal to each other during the three-dimensional processing. Likewise, there are also protrusions (not illustrated) provided in a grid pattern on the surface of the other roller 22. Then, the rollers 21 and 22 are engaged so that the protrusions of the roller 22 are oriented toward the center 27 of a virtual quadrangle having four adjacent protrusion portions 23a, 23b, 23c and 23d of the other roller 21 as the apices. In other words, the rollers 21 and 22 are engaged so as to form the protrusions of the rollers 21 and 22 at the position of the black circles and white circles shown in FIG. 3b, respectively.

Figure 4C:
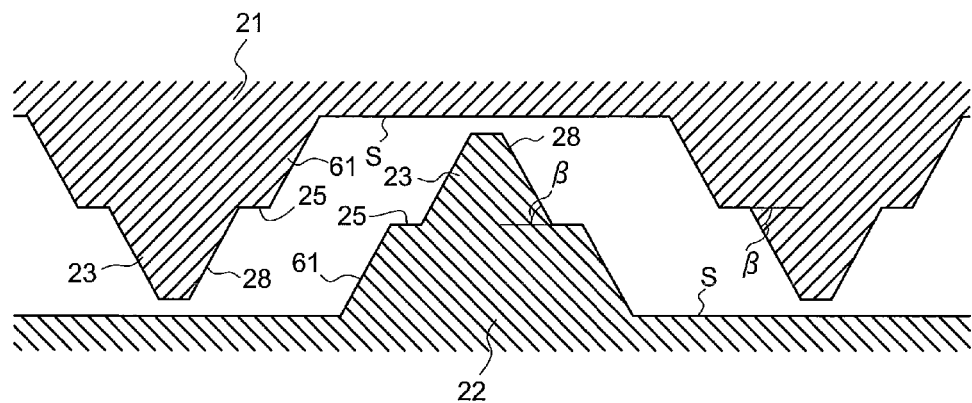
FIG. 4c is a view showing the state where a pair of rollers is engaged.
Figure 4D:
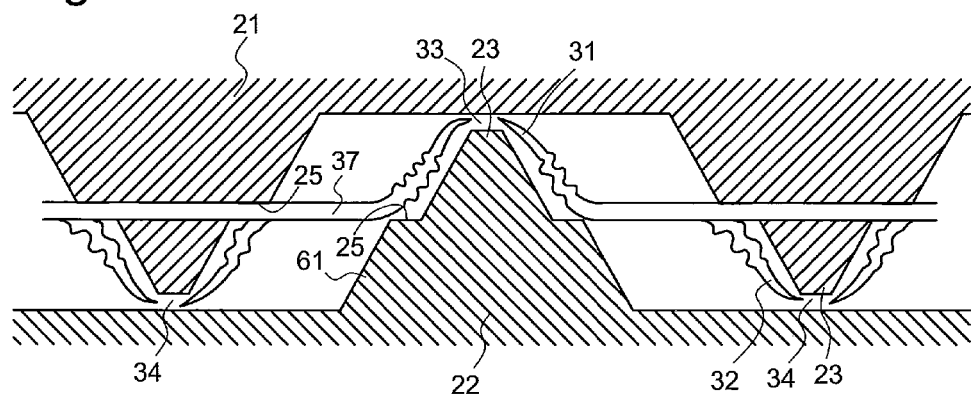
FIG. 4d is a view showing an embodiment where the three-dimensional substrate is formed by a pair of the rollers of FIG. 4c.

FIG. 4c is a schematic cross-sectional view showing the state where the rollers 21 and 22 are engaged. FIG. 4d is a view showing an embodiment where a three-dimensional substrate is formed by a pair of the rollers. With the metal foil F interposed between rollers 21 and 22, the hollow convex portion 31 and the hollow concave portion 32 as shown in FIGS. 3a to 3c are formed on the substrate 20 by the protrusions 23. Additionally, opening portions 33 and 34 are formed in the hollow convex portion 31 and the hollow concave portion 32, respectively. Furthermore, since the non-processed portion 37 of the substrate 20 is fixed between the flat portions 25 of the rollers 21 and 22, the heights of the hollow convex portion 31 and the hollow concave portion 32 from the non-processed portion 37 are substantially equal to each other and the non-processed portion 37 of the three-dimensional substrate 20 is formed without being displaced from the center position C in the thickness direction.

Figure 4E:
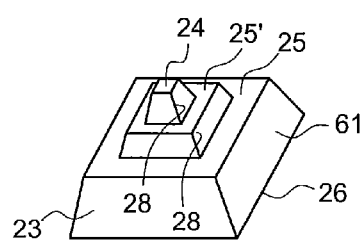
FIG. 4e is a view showing the other embodiment of the protrusion portion of the roller.
Figure 4F:
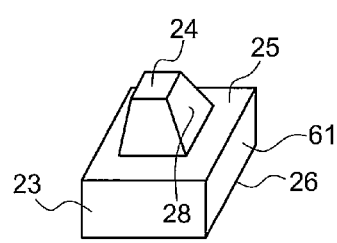
FIG. 4f is a view showing the other embodiment of the protrusion portion of the roller.

It is noted that two flat portions 25 and 25' may be provided in the protrusion portion 23, as shown in FIG. 4e, and may be provided more than two. In addition, as shown in FIG. 4f, the base bottom portion 61 of the protrusion portion 23 may have a rectangular parallelepiped shape.

A rising angle β of a side surface 28 of the tip portion 24 of the protrusion portion 23 (an angle made by the surface S of the roller 21 or 22 and the side surface 28 of the roller 21 or 22) is preferably 55 to 75 degrees, more preferably 55 to 65 degrees. When the rising angle β is within this range, the innumerable wrinkles 40 are formed on the side surfaces 35 and 36 at the time of forming the hollow convex portion 31 and the hollow concave portion 32. When the rising angle β is less than 55 degrees, the number of the wrinkles to be formed becomes small. On the other hand, when the rising angle β exceeds 75 degrees, the side surfaces 35 and 36 are easily broken at the time of forming the hollow convex portion 31 and the hollow concave portion 32.

Furthermore, the rollers 21 and 22 are provided with only the protrusions 23 and the concave portions are not formed thereon. When the metal foil F is three-dimensionally processed, even if a part of the metal foil F is broken into chips, the chips are not accumulated in the rollers 21 and 22. As a result, the three-dimensional substrate 20 can be continuously manufactured without cleaning the rollers 21 and 22 regularly.

Figure 5A:
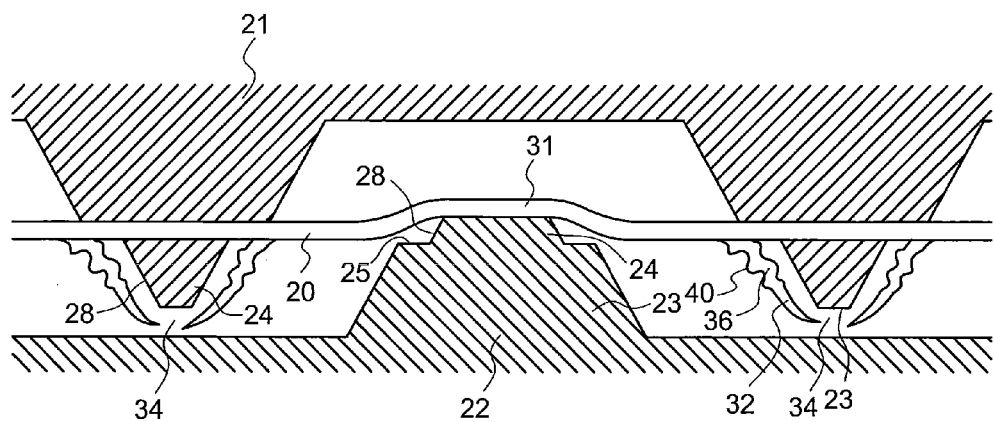
FIG. 5a is a view showing an embodiment where the three-dimensional substrate is formed by a pair of the rollers in which the square shape of the tip portion of the protrusion portions on the one roller is larger than that of the other roller.

When a soft metal foil (for example, aluminum foil or copper foil) is three-dimensionally processed, if there are a large number of the hollow convex portions 31 and the hollow concave portions 32, physical strength such as tensile strength may be lowered. In this case, the space between the adjacent hollow convex portions 31 and the space between the adjacent hollow concave portions 32 may be extended. Furthermore, if the substrate such that a space between the adjacent hollow convex portions 31 (hollow concave portions 32) is as narrow as the nickel substrate is required, the substrate is preferably three-dimensionally processed by using a pair of the rollers 21 and 22 in which the square shape of the tip portion 24 of the protrusion portion 23 of the one roller 22 is made larger compared with that of the protrusion portion 23 of the other roller 21, as shown in FIG. 5a. In this case, the hollow concave portion 32 has the opening portion 34, but the hollow convex portion 31 has no opening portion.

Figure 5B:
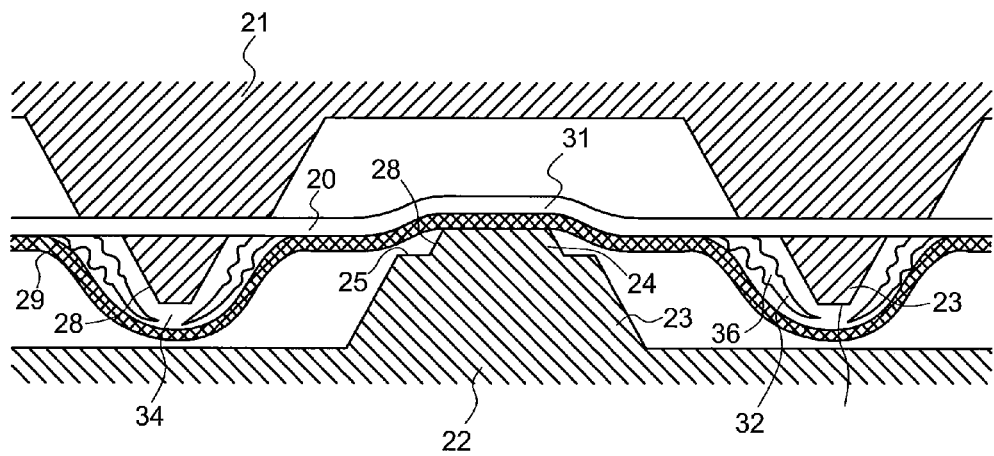
FIG. 5b is a view showing an embodiment where the three-dimensional substrate is formed by a pair of the rollers of FIG. 5a with a synthetic resin film interposed between the metal foil and the one roller.

In addition, in the processing of the soft metal, chips made of aluminum or copper may be fallen off and adhered to the hollow convex portions 31 and the hollow concave portions 32 of 3DF. Micro short circuit may be caused when the substrate to which chips remain adhered is used. In this case, it is desirable that a soft film 29 made of synthetic resin (for example, a film of polyethylene, polyvinyl chloride, or polypropylene) is interposed between the one roller 22 and the substrate (aluminum foil or copper foil) 20 and chips are adhered to the soft film 29, thereby removing the chips together with the soft film 29, as shown in FIG. 5b.

EXAMPLES

Next will explain the difference in effect compared with Examples and Comparative Examples of the present invention.

Example 1

A nickel-made three-dimensional substrate (3DF) was prepared by using a pair of the rollers 21 and 22 as illustrated in FIGS. 4a to 4d, three-dimensionally processing a nickel foil (having a thickness before processing of 25 μm) so that the space between the adjacent hollow convex portions 31 (hollow concave portions 32) is approximately 700 μm, and further passing the foil between a pair of rollers having a flat surface (not illustrated) to be adjusted to a desirable apparent thickness (400 μm: A-type, 300 μm: B-type). The obtained three-dimensional substrate has innumerable wrinkles 40 on the side surfaces of the hollow convex portion and hollow concave portion.

The paste obtained by kneading a powder mixture having a weight ratio of generally used nickel hydroxide $(Ni(OH)_2)$ powder to cobalt oxide powder of 96:4 with an aqueous solution of fluorine resin powder (1 wt. %) and carboxymethyl cellulose (0.3 wt. %) was coated onto the A-type three-dimensional substrate. After dried, it was pressurized, thereby obtaining a nickel positive electrode having an average filling density of 650 mAh/cc and a thickness of 350 μm.

Next, this electrode was cut into 43 mm in width and 400 mm in length, followed by removing the coated material having a width of 4 mm along the longitudinal edge of one side to form a metal exposure portion, thereby obtaining a positive electrode for a cylindrical sealed Cs-sized battery with a theoretical capacity of about 3.5 Ah.

The paste obtained by kneading generally used $MmNi_5$ hydrogen absorbing alloy $(Mm-(Ni-Co-Mn-Al)_5)$ powder with an aqueous solution of fluorine resin powder (1 wt. %) and carboxymethyl cellulose (0.3 wt. %) was coated onto the B-type three-dimensional electrode substrate. After dried, it was pressurized, thereby obtaining a hydrogen absorbing alloy negative electrode with an average filling density of 1,500 mAh/cc and a thickness of 200 μm.

Next, after this electrode was cut into 43 mm in width and 480 mm in length, the coated paste was removed along the longitudinal edge of one side to form a metal exposure portion having a width of 4 mm, thereby obtaining a negative electrode of a Cs-sized battery with a theoretical capacity of about 5.5 Ah.

The obtained positive and negative electrodes were spirally rolled with a non-woven cloth made of polyolefin having a thickness of 0.12 mm, a width of 44 mm and a length of 900 mm interposed therebetween, thereby obtaining an electrode group by a conventional method. Next, the metal exposure portion 1' of the positive electrode 1 exposed to the upper surface of the electrode group was bent in the center direction of the spiral together with a separator 3, as shown in FIG. 1. Next, the metal exposure portion 2' of the negative electrode 2 exposed to the lower surface of the electrode group was bent in the center direction of the spiral together with the separator 3. The positive electrode 1 and the negative electrode 2 employed the structure in which their ends are shifted in a cylindrical axis direction by 1 to 2 mm in order to completely prevent short circuit at the time of bending of the metal exposure portions 1' and 2'.

A nickel-made current collecting plate 9 was respectively welded to the metal exposure portion 1' bent to the side of the positive electrode 1 of the obtained electrode group, and a nickel lead plate 5 was further welded thereto. Next, after inserting the electrode group into the case 4 and welding the nickel lead plate to the cover body 6 (positive electrode terminal), 8 cc of alkali electrolyte mainly containing generally used potassium hydroxide (KOH) and having a specific gravity of about 1.3 was poured into the case and then, it was sealed with the cover body and a gasket 10, thereby obtaining a Cs-sized Ni/MH battery.

As the three-dimensional substrate to be used, there was used the substrate having an opening portion at the tip of the hollow convex portion and the hollow concave portion. There may also be used the substrate processed by changing the shape of the protrusion portions on the rollers so that a rising angle of the side surface of the hollow convex portion and the hollow concave portion is made close to 60 degrees and the hollow convex portion and the hollow concave portion have an opening portion on the side surface thereof.

The obtained Cs-sized battery (with a theoretical capacity of 3.5 Ah) was charged and discharged two cycles under the condition of 100% charging at the charging rate of 0.1 C and discharging at the discharging rate of 0.2 C up to the end voltage of 1.0 V at room temperature. After that, formation was completed by charging and discharging the battery with only charging changed to 120%. Discharge results obtained when the battery after completing formation was charged and discharged with 100% charging at the charging rate of 0.1 C and discharging at the discharging rate of 0.2 C and 5 C are represented by e and e' in FIG. 6, respectively.

Comparative Example 1

A Cs-sized Ni/MH battery having the same electrodes and battery constitution as Example 1 was used herein. However, the rising angle of the side surface of the hollow convex portion and the hollow concave portion of the three-dimensional substrate used for both electrodes was set to be about 50 degrees.

Figure 6:
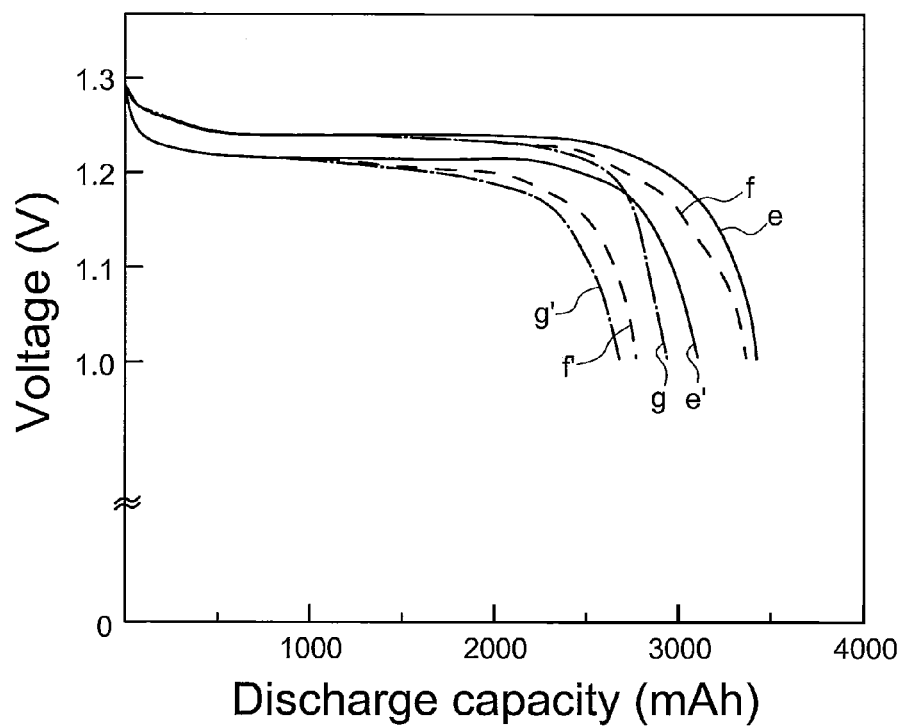
FIG. 6 is a view showing a discharge property in the Ni/MH battery according to Example 1 and Comparative Examples 1 and 2.

Discharge results obtained when the same formation as Example 1 was subjected to the battery of Comparative Example 1, followed by charging and discharging the battery with 100% charging at the charging rate of 0.1 C and discharging at the discharging rate of 0.2 C and 5 C are represented by f and f' in FIG. 6, respectively.

Comparative Example 2

As the substrate of the positive electrode 1, a generally used foamed nickel substrate having a porosity of 95% and a thickness of 800 μm, in which the metal exposure portion 1' is weld-reinforced with a nickel foil, was used, thereby obtaining a nickel positive electrode (with a theoretical capacity of 3.2 Ah) by the same materials and process as Example 1.

As the substrate of the negative electrode 2, a generally used nickel-plated punched steel (NPPS) substrate having a thickness of 60 μm was used, thereby obtaining a negative electrode (with a theoretical capacity of 5.0 Ah) by the same materials and process as Example 1. Then, the same spirally-rolled electrode group as Example 1 was obtained.

Next, nickel-made discs having a thickness of 200 μm were welded to both ends of the electrode group, that is, portions corresponding to leads of the positive and negative electrodes 1 and 2, respectively, thereby obtaining a Cs battery with a theoretical capacity of 3.2 Ah by the same process as Example 1. Besides, since the metal exposure portions 1' and 2' were welded to the nickel discs without being bent, each effective width of the positive and negative electrodes 1 and 2 became narrower by 2 mm than Example 1.

Discharge results obtained when the same formation as Example 1 was subjected to the battery of Comparative Example 2, followed by charging and discharging the battery with 100% charging at the charging rate of 0.1 C and discharging at the discharging rate of 0.2 C and 5 C are represented by g and g' in FIG. 6, respectively.

Compared with Example 1 and Comparative Example 1, no significant difference in voltage and capacity was acknowledged in the discharge at the discharging rate of 0.2 C. However, in the discharge at the discharging rate of 5 C, Comparative Example 1 resulted in a large voltage drop and Example 1 indicated a significant superiority in voltage and capacity. This is considered that because Example 1 has innumerable wrinkles formed on the surface of the three-dimensional substrate, while Comparative Example 1 has fewer wrinkles and the contact area with active material powder is decreased, a significant difference in property from Example 1 was observed in a high-rate discharge such as 5 C discharging rate.

Also, a structure in which the metal exposure portions 1' and 2' are bent can be employed in Example 1 because the three-dimensional substrate is flexible, thereby increasing the effective area of the electrodes 1 and 2. As a result, in the discharge at the discharging rate of 0.2 C, the battery capacity was increased by about 10% as compared with Comparative Example 2. In the discharge at a high discharging rate of 5 C, much better characteristic results than Comparative Example 2 were obtained in both battery capacity and voltage. If a high-rate discharge is further performed, the difference is predicted to be more enlarged. The reason is considered to come from the fact that Example 1 employed a structure in which the metal exposure portion 1' of the positive electrode 1 and the metal exposure portion 2' of the negative electrode 2 were bent, thereby reducing its internal impedance, and that Example 1 employed a three-dimensional substrate excellent in current collecting performance instead of the punched substrate of Comparative Example 2.

Example 2

An aluminum-made three-dimensional substrate and copper-made three-dimensional substrate were prepared by using a pair of the rollers 21 and 22 as described in FIGS. 4a and 4b, three-dimensionally processing an aluminum (Al) foil having a thickness of 15 μm and a copper (Cu) foil having a thickness of 10 μm so that a space between the adjacent hollow convex portions 31 (hollow concave portions 32) is approximately 700 μm, further passing each of the foils between a pair of rollers having a flat surface (not illustrated) to be adjusted to a desirable thickness (each apparent thickness of about 150 μm). These substrates functioned as electrode substrates for positive and negative electrodes, respectively.

Figure 2:
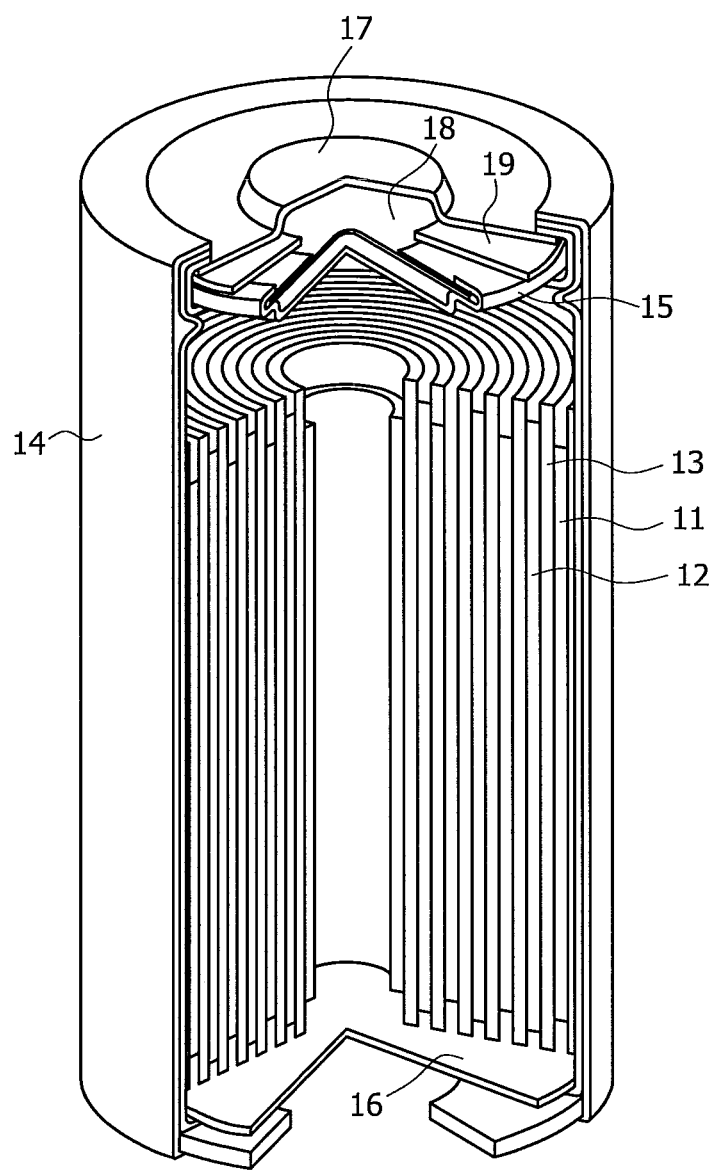
FIG. 2 is a schematic cross-sectional view of the lithium-ion battery according to the present invention.

By using these substrates, an AA-sized battery of the $LiCoO_2$/C system was prepared. FIG. 2 shows a structure of the AA-sized cylindrical lithium-ion battery using the three-dimensional substrate mainly made of aluminum as the positive electrode and the three-dimensional substrate mainly made of copper as the negative electrode. The positive electrode 11 was obtained by using aqueous paste containing lithium cobaltate ($LiCoO_2$) powder as a main material, in which about 1.5 wt. % of fluorine resin (PTFE) fine powder was mixed into the aqueous paste, coating the aqueous paste thereon and after a process of passing through a slit (which is a general method in alkaline storage battery), coating/filling active material (paste) to the aluminum-made three-dimensional substrate, and drying, followed by carrying out pressing. The size of the positive electrode 11 was 39 mm in width, 750 mm in length, 120 μm in thickness and its theoretical capacity was 1500 mAh. The positive electrode 11 was connected to a current collector 15 in the same way as a generally used battery.

The negative electrode 12 was obtained in the same method as that of the positive electrode by coating onto/filling into the copper-made three-dimensional substrate aqueous paste containing a graphite powder as a main material, in which the aqueous paste was kneaded with about 1.0 wt. % of latex (SBR), and drying, followed by carrying out pressing. The size of the negative electrode 12 was 39 mm in width, 800 mm in length, 120 μm in thickness and its theoretical capacity was 2000 mAh. The negative electrode 12 was connected to a current collector 16 in the same way as a generally used battery.

Both of the electrodes 11 and 12 were spirally rolled with a separator 13 made of polyethylene film having micropores interposed therebetween and inserted into a generally used metal case 14, and electrolyte was poured into the case, followed by sealing the case with a cover body 18. A cap 17 functioning as the positive electrode terminal was mounted on the cover body 18. As the electrolyte, there was used a mixed organic solvent of 2 parts of ethylene carbonate (EC) and 8 parts of methylethyl carbonate (MEC), in which 1 mol of $LiPF_6$ was dissolved.

Furthermore, as in the generally used battery, there was provided, as a safety measure, a PTC element 19 which disconnects the connection between the current collector of the positive electrode and the cap functioning as the terminal when the temperature of the battery becomes high, thereby preparing an AA-sized lithium-ion battery.

Figure 7:
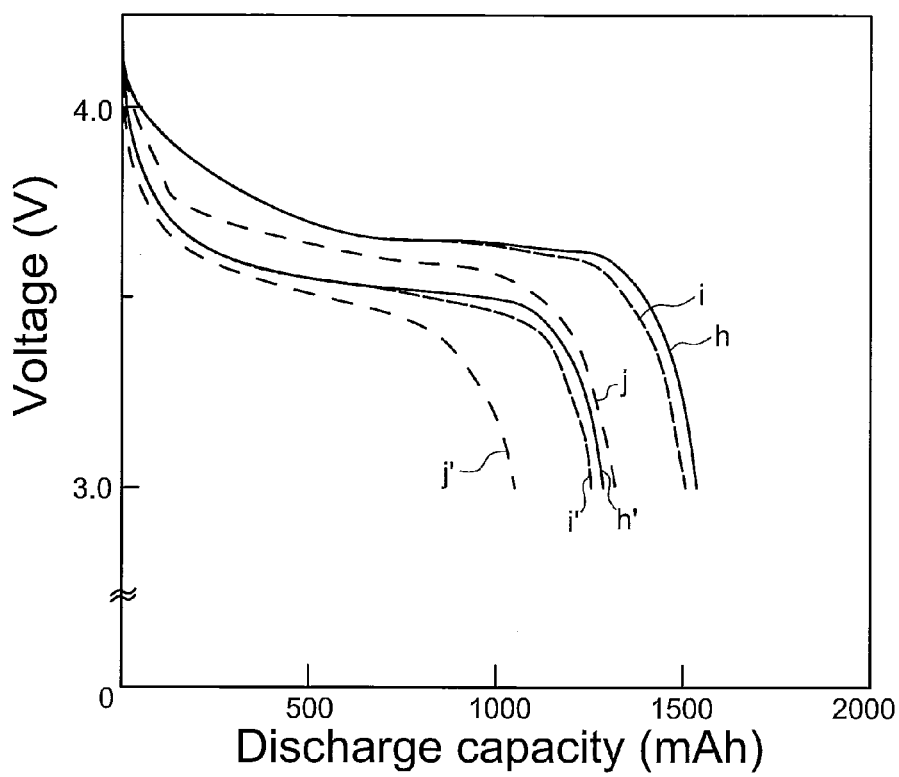
FIG. 7 is a view showing a discharge property in the lithium-ion battery according to Examples 2 and 3 and Comparative Example 3.

Discharge results obtained when the obtained AA-sized battery (with a theoretical capacity of 1500 mAh) was charged and discharged one cycle under the condition of charging at 0.1 C charging rate up to 4.2 V end voltage and discharging at 0.2 C discharging rate up to 3.0 V end voltage at room temperature, followed by charging and discharging the battery under the condition of charging at 0.1 C charging rate up to 4.2 V end voltage and discharging at 0.2 C and 5 C discharging rate up to 3.0 V end voltage are represented by h and h' in FIG. 7, respectively. It is found that the battery obtained in Example 2 had a substantially theoretical capacity, and there were a small voltage drop and small reduction in capacity even at high-rate discharge such as 5 C discharging rate.

Comparative Example 3

The battery of Comparative Example 3 has the same basic structure as that of Example 2. An aluminum foil having a thickness of 15 μm was used for the positive electrode 11, and a copper foil having a thickness of 10 μm was used for the negative electrode 12 in the same manner as the generally used battery, respectively. As the method for manufacturing the respective electrodes 11 and 12, a process of coating a certain amount of the paste onto both surfaces of the metal foil (which is a generally employed method) was employed. Furthermore, the positive and negative thin electrodes each having a thickness of 80 μm were prepared in the same manner as the generally used battery. In addition to the thin electrodes, the separator 13 became longer than Example 2, thereby obtaining electrodes such that the theoretical capacity of the positive electrode 11 is 1300 mAh and the theoretical capacity of the negative electrode 12 is 1600 mAh, respectively. Then, an AA-sized battery was prepared in the same manner as Example 2 except the electrodes have different structures and sizes.

Discharge results obtained when the battery of Comparative Example 3 (with a theoretical capacity of 1500 mAh) was charged and discharged one cycle under the condition of charging at 0.1 C charging rate up to 4.2 V end voltage and discharging at 0.2 C discharging rate up to 3.0 V end voltage at room temperature, followed by charging and discharging the battery under the condition of charging at 0.1 C charging rate up to 4.2 V end voltage and discharging at 0.2 C and 5 C discharging rate up to 3.0 V end voltage are represented by j and j' in FIG. 7, respectively.

From the discharge result at 0.2 C discharging rate, it is found that the electrode thickness of the battery of Example 2 can be made thicker than that of the battery of Comparative Example 3 (which can reduce its area) and therefore, the area of the separator 13 can be reduced, the battery capacity is increased by about 250 mAh and an excellent flatness of discharge curve is achieved. It is apparent that when the discharging rate is increased to 5 C, the battery of Example 2 has a smaller reduction in battery capacity and smaller discharge voltage drop than the battery of Comparative Example 3. Therefore, the battery of Example 2 is found to provide improved current collecting performance and significantly improved high-rate discharge.

Example 3

Instead of the method for manufacturing the three-dimensional substrate of Example 2, a method for manufacturing a three-dimensional substrate, in which three-dimensional processing is performed with the rollers 21 and 22 as shown in FIG. 5b interposing a synthetic resin film (made of polyethylene) 29 having a thickness of about 10 μm between the roller 22 and the metal foil 20, followed by removing the film therefrom, was employed herein. The three-dimensional substrate having the same size after processing as that of Example 2 was used. This three-dimensional substrate was so constituted that the hollow convex portion 31 on one surface has no opening portion, the hollow concave portion 32 on the other surface has an opening portion 34, and innumerable wrinkles 40 are formed on a side surface 36. The other constitution of Example 3 was the same as that of Example 2, thereby obtaining an AA-sized battery.

This manufacturing method allows most of chips generated by the three-dimensional processing of the soft metal foil (such as copper foil or aluminum foil) to be removed, resulting in prevention of micro short circuit. Additionally, since an opening portion is not formed in the hollow convex portion 31 by the tip portion 24 of the protrusion portion 23 of the roller 22, there are no metal chips generated.

When the battery of Example 3 was charged and discharged under the same condition as Example 2, discharge results at 0.2 C and 5 C discharging rate were represented by i and i' in FIG. 7, respectively. Features of battery capacity and discharge curve of Example 3 were almost the same as those of Example 2 and the obtained results were significantly better than those of Comparative Example 3.

The method for manufacturing a three-dimensional substrate having the hollow convex and concave portions according to the present invention makes it easy to realize continuous manufacturing by improvement of the rollers to be used for processing. Furthermore, by forming innumerable wrinkles on the surface of the three-dimensional substrate of the present invention, current collecting performance is improved, thereby allowing to provide a secondary battery having excellent energy density and high-rate discharging property. In particular, if the three-dimensional substrate is applied to the lithium-ion battery, because falling-off of the active material can be prevented, the thickness of the electrode can be further increased, thereby allowing to provide a battery which is further excellent in energy density and high-rate discharging property.

Hereinabove, an explanation has been made as to the cylindrical secondary battery, but the three-dimensional substrate of the present invention is also applicable to a square-type secondary battery of various sizes because of features of the electrodes using the three-dimensional substrate. Furthermore, by accordingly selecting the material of the electrodes or the active material, the three-dimensional substrate of the present invention is applicable to the other electrochemical applied products (for example, a lithium polymer battery, a lithium-ion capacitor, an electric double-layer capacitor and the like) having similar constitution or structure of the electrodes to the exemplified Ni/MH battery or lithium-ion battery.

What is claimed is:

1. A method for manufacturing a metal-made three-dimensional substrate with hollow protrusions having openings on both ends arranged on a front side and a back side, wherein the three-dimensional substrate is manufactured by passing a metal foil with a pair of rollers interposed therebetween, wherein each surface of the pair of rollers is provided with protrusion portions arranged in a grid pattern and surrounded by a flat surface, the protrusion portions are arranged so that each of the protrusion portions of the one roller is oriented toward the center of a virtual quadrangle having four adjacent protrusion portions of the other roller as the apices, the protrusion portion of one of the rollers has a base bottom portion that protrudes from the flat surface that surrounds the base bottom portion, and a flattened truncated tip portion that extends from the base bottom portion with at least one flat portion between the base bottom portion and the truncated tip portion, the surface of the other roller has a flat surface corresponding to the protrusion portion that is free from indentations or concavities, and a hollow convex portion or a hollow concave portion is formed in a grid pattern, an opening portion is formed on the tip or the side surface of the hollow convex portion or the hollow concave portion by the protrusion portion of the one roller or the other roller, and a non-processed portion of the substrate is fixed alternately between each flat portion of the one roller and the other roller.

2. The method for manufacturing the metal-made three-dimensional substrate as set forth in claim 1, wherein a rising angle of a side surface of the protrusion portion relative to the roller surface is 55 to 75 degrees.

3. The method for manufacturing the metal-made three-dimensional substrate as set forth in claim 1, wherein a synthetic resin film is interposed between at least the one roller and the metal foil.

* * * * *